United States Patent
Turabi et al.

(10) Patent No.: US 10,461,993 B2
(45) Date of Patent: Oct. 29, 2019

(54) NETWORK HUB SITE REDUNDANCY AND FAILOVER

(71) Applicant: Cisco Technology, Inc., San Jose, CA (US)

(72) Inventors: Mosaddaq Hussain Turabi, San Jose, CA (US); Vinay Prabhu, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/040,236

(22) Filed: Jul. 19, 2018

(65) Prior Publication Data

US 2019/0140891 A1   May 9, 2019

Related U.S. Application Data

(60) Provisional application No. 62/539,459, filed on Jul. 31, 2017.

(51) Int. Cl.
| | |
|---|---|
| *H04L 12/24* | (2006.01) |
| *H04L 12/26* | (2006.01) |
| *H04L 29/12* | (2006.01) |

(52) U.S. Cl.
CPC ...... *H04L 41/0668* (2013.01); *H04L 41/0681* (2013.01); *H04L 41/0686* (2013.01); *H04L 43/0811* (2013.01); *H04L 43/0817* (2013.01); *H04L 61/2069* (2013.01)

(58) Field of Classification Search
None
See application file for complete search history.

(56) References Cited

U.S. PATENT DOCUMENTS

| | | | | |
|---|---|---|---|---|
| 9,104,643 | B2 * | 8/2015 | DeCusatis | G06F 11/2005 |
| 2010/0202465 | A1 * | 8/2010 | Sakata | H04L 45/00 |
| | | | | 370/400 |
| 2014/0071813 | A1 * | 3/2014 | Cheung | H04L 49/65 |
| | | | | 370/228 |
| 2014/0321265 | A1 * | 10/2014 | Pitchai | G06F 11/2097 |
| | | | | 370/219 |
| 2015/0172102 | A1 * | 6/2015 | DeCusatis | H04L 45/28 |
| | | | | 370/218 |
| 2017/0317953 | A1 * | 11/2017 | Sareen | H04L 49/25 |

* cited by examiner

*Primary Examiner* — Brian S Roberts
(74) *Attorney, Agent, or Firm* — Polsinelli PC

(57) ABSTRACT

A method may include receiving a hub ID configuration preference message from a control device, wherein the hub ID configuration preference message includes an order in which to connect to network hubs that are associated with the hub IDs; selecting the first hub ID from the hub ID configuration preference message based on the first connection priority having a higher priority as compared to the second connection priority; identifying a first set of network hubs that are associated with the first hub ID; establishing a connection with at least one network hub associated with the first hub ID; in response to identifying a triggering event, selecting the second hub ID from the hub ID configuration preference message; identifying a second set of network hubs that are associated with the second hub ID; and establishing a connection with at least one network hub associated with the second hub ID.

20 Claims, 6 Drawing Sheets

US 10,461,993 B2

NETWORK HUB SITE REDUNDANCY AND FAILOVER

CROSS REFERENCE TO RELATED APPLICATIONS

This application claims priority to U.S. Patent App. No. 62/539,459, filed on Jul. 31, 2017, which is hereby incorporated by reference in its entirety.

FIELD

The embodiments discussed in the present disclosure are related to network hub site redundancy and failover.

BACKGROUND

The use of networks is a useful tool in allowing communication between distinct computing devices. Despite the proliferation of computers and networks over which computers communicate, there still remains various limitations to current network technologies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that may include receiving a hub ID configuration preference message from a control device, wherein the hub ID configuration preference message includes an order in which to connect to network hubs that are associated with the hub IDs; selecting the first hub ID from the hub ID configuration preference message based on the first connection priority having a higher priority as compared to the second connection priority; identifying a first set of network hubs that are associated with the first hub ID; establishing a connection with at least one network hub associated with the first hub ID; in response to identifying a triggering event, selecting the second hub ID from the hub ID configuration preference message; identifying a second set of network hubs that are associated with the second hub ID; and establishing a connection with at least one network hub associated with the second hub ID.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure relate to improvements to the operation of networks. For example, an edge network device (e.g., a router) may connect to one or more hubs. During the course of operation, the edge network device may lose connection with the one or more hubs. Under conventional systems, the edge network device may be connected to every other node according to the Bidirectional Forwarding Detection (BFD) network protocol. For large-scale networks, however, an edge network device being connected to every other node in the network may be overkill and may actually reduce performance of the edge network device and/or the network as a whole. Some conventional techniques aimed to aid in large-scale networks may group nodes such that the edge network device may be connected to all of the nodes in a particular group and not to nodes in other groups. These approaches, however, are static in nature and do not provide failover capabilities. Further, the conventional grouping techniques use policies and are not conducive to "point and deploy" architectural models of fast scalability and quick network changes.

Aspects of the present disclosure address these and other shortcomings by providing network hub site redundancy and failover. Embodiments of the present disclosure may provide improvements to computer networks and to the operation of computers themselves. For example, using one or more embodiments of the present disclosure, the disclosed system and techniques may provide enhanced capabilities to large-scale networks, such as redundancy, fail over, fast scalability and quick network changes. Further, the disclosed system and techniques may allow efficient use of resources, such as bandwidth and hardware, without compromising redundancy. The disclosed system and techniques may help in large scale network design and maintenance and may provide protection from brown/black outs. Further, the disclosed system and techniques may permit the creation of point and deploy network topologies without policies.

Embodiments of the present disclosure are explained with reference to the accompanying drawings.

Figure 1:
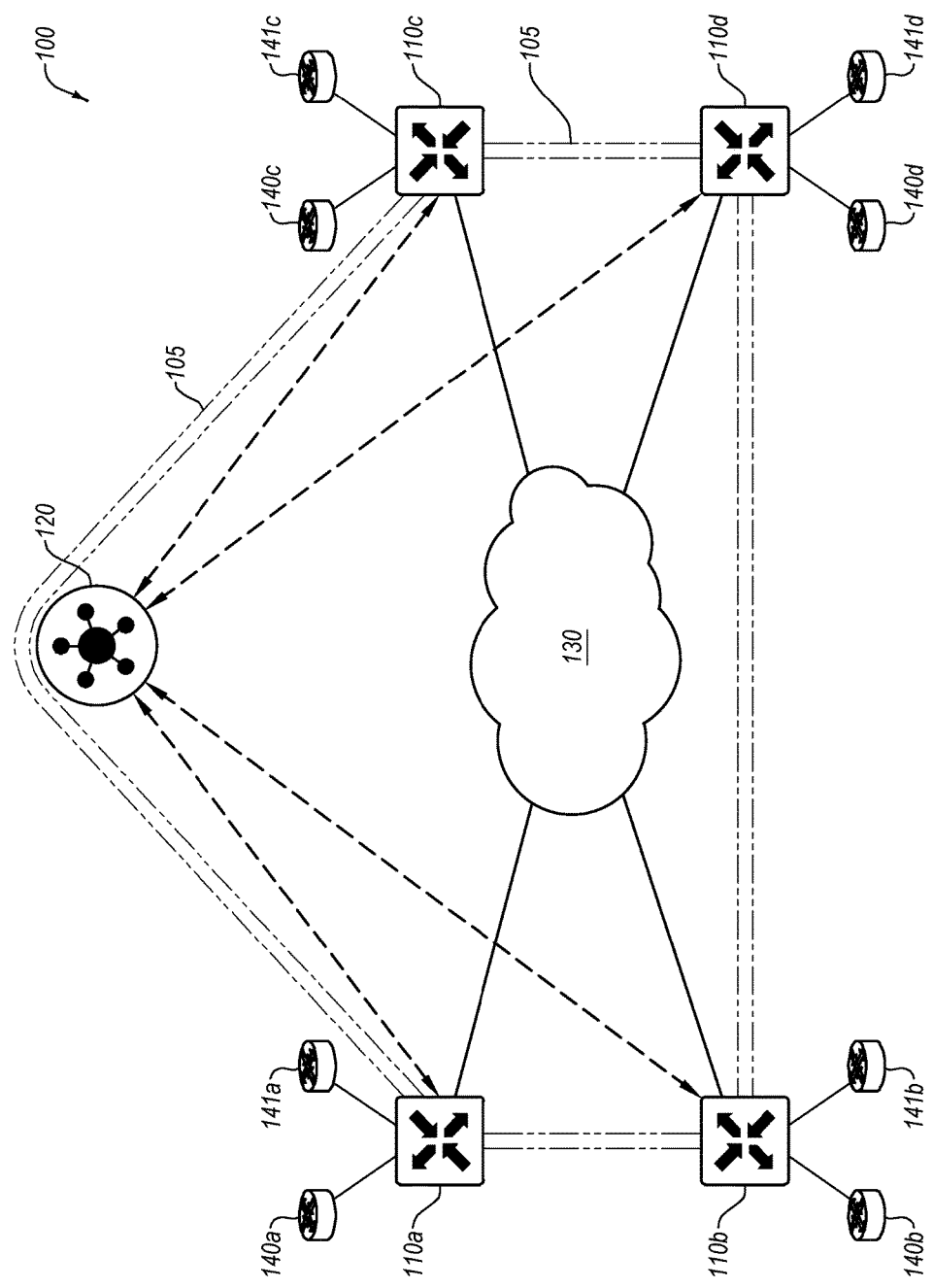
FIG. 1 illustrates an example system of network components implementing a software-defined network (SDN)

FIG. 1 illustrates an example system 100 of network components implementing a software-defined network (SDN), in accordance with one or more embodiments of the present disclosure. The SDN may include any type of network or network topology. For example, the SDN may include a software-defined wide area network (SD-WAN), software-defined local area network (LAN), software-defined metropolitan area network (MAN), or any other type of network. The system 100 may include an internal network domain 105 and one or more external network domains. The system 100 may include one or more edge network devices 110 (such as the edge network devices 110a-110d), one or more control devices 120, a communication network 130, and external network devices 140 and 141 (such as the external network devices 140a-140d and 141a-141d).

For ease and clarity in explanation, some examples of the present disclosure are described with respect to a WAN where the network is managed at least partially by software rather than controlled by hardware. As such, the SDN may support multiple types of connections or communication links, such as the Internet, MultiProtocol Label Switching (MPLS) connections, and/or cellular connections (such as Long Term Evolution (LTE), LTE Advanced, Worldwide Interoperability for Microwave Access (WiMAX), Evolved High Speed Packet Access (HSPA+), and/or others). Additionally, the SDN may support load balancing or load sharing between the various connections. Further, because of the distributed nature of some networks, the SDN may support virtual private networks (VPNs), firewalls, and other security services. In an SD-WAN, for example, a control plane may be functionally separated from the physical topology. In some embodiments, the SDN may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, the one or more control devices 120 may be configured to manage the control plane of an internal network domain 105 by directing one or more aspects of the operation of the edge network devices 110. For example, the one or more control devices 120 may generate and/or distribute policies to one or more of the edge network devices 110. A policy may include a rule or set of rules bearing on the handling of network traffic, such as routing, priority, media, etc. The internal network domain 105 may operate as a secured and controlled domain with specific functionality and/or protocols. In some embodiments, the edge network devices 110 may handle data traffic based on one or more policies created and/or propagated by the one or more of the control devices 120. In these and other embodiments, the edge network devices 110 may route data traffic within the internal network domain 105 based on the policies created and/or propagated by the one or more of the control devices 120.

In some embodiments, the one or more control devices 120 may form a control plane connection with some or all of the edge network devices 110. The control plane connection may facilitate the exchange of data between the edge network devices 110 and the one or more control devices 120 for management and control of the internal network domain 105. The control plane connection may operate via a tunnel through the communication network 130, such as a Datagram Transport Layer Security (DTLS) tunnel. In some embodiments, data transmitted over the control plane connection may facilitate the one or more control devices 120 determining topology of the communication network 130. For example, the one or more control devices 120 may communicate with the edge network devices 110 to determine what physical connections exist between and among the edge network devices 110 in the communication network 130. Additionally or alternatively, data transmitted over the control plane connection may facilitate the one or more control devices 120 determining available, optimal or desired paths across the communication network 130 between and among the edge network devices 110. Additionally or alternatively, data transmitted over the control plane connection may facilitate the edge network devices 110 determining available, optimal or desired paths across the communication network 130 between and among the edge network devices 110. Additionally or alternatively, the one or more control devices 120 may communicate route information and/or hub ID configuration preference messages to the edge network devices 110 over the control plane connection. In these and other embodiments, the control plane connection may include a semi-permanent connection between the one or more control devices 120 and the edge network devices 110 such that if the connection between the a particular control device 120 and a given edge network device 110 is broken, the edge network device 110 may connect to another control device based on a hub ID configuration preference message.

The hub ID configuration preference message may include a set of hubs to which a particular edge network device 110 may connect and an order in which to connect to the set of hubs. As the term is used herein, a hub may include a node to which multiple other nodes are connected. For example, a hub may include one or more control devices 120. Similarly, a hub may include an edge network device 110 that is connected, in a hub and spoke topology, to multiple other edge network devices 110. The hub ID configuration preference message may be generated by one or more of the control devices 120. In at least some embodiments, the hub ID configuration preference message may be generated in response to input received from a system administrator. In at least some embodiments, the hub ID configuration preference message may be generated in response to data analytics performed on the system 100 to determine hub ID configuration preferences. Further details on hub ID configuration preferences and hub ID configuration preference messages are described in conjunction with FIGS. 3-4.

The hub ID configuration preference message may include an order in which a particular edge network device 110 or group of edge network devices are to connect to one or more network hubs (e.g., one or more control devices 120). For example, the hub ID configuration preference message may include a first hub ID associated with a first configuration preference and a second hub ID associated with a second configuration preference. The first configuration preference may include a higher priority as compared to the second configuration preference.

In some embodiments, the one or more of the control devices 120 may maintain a central route table that stores route information within the internal network domain 105 and/or hub ID configuration preferences for various nodes in the system. For example, the one or more of the control devices 120 may communicate with various edge network devices 110 to determine the physical and/or logical connections available to the edge network devices 110 through the communication network 130. In some embodiments, the edge network devices 110 may include one or more physical and/or logical connections to each other. In these and other embodiments, the one or more of the control devices 120 may generate and/or update one or more policies in conjunction with the central route table to help the edge network devices 110 to determine data traffic routes through the internal network domain 105. For example, the one or more of the control devices 120 may provide policies and other configuration preferences related to traffic flows to the edge network devices 110 rather than being involved with every individual flow through the internal network domain 105. In these and other embodiments, the one or more control devices 120 may generate and/or update one or more hub ID configuration preferences in conjunction with the central route table to help the edge network devices 110 to determine connectivity to different nodes through the internal network domain 105. For example, the one or more of the control devices 120 may provide hub ID configuration preference messages related to connectivity to the edge network devices 110 rather than being involved with every individual connection or disconnection between nodes in the system 100.

In some embodiments, the one or more of the control devices 120 may receive one or more keys from the edge network devices 110 used in communication of data over the data plane. For example, one or more data packets may use one or more keys for security purposes in transmitting data from one edge network device 110 to another edge network device 110. In these and other embodiments, the one or more of the control devices 120 may reflect the received keys to one or more other edge network devices 110 that may be in the traffic flow based on the central route table and/or the policies implemented by the one or more of the control devices 120. In these and other embodiments, a given edge network device 110 may generate symmetrical keys to facilitate secure communication between edge network devices. In these and other embodiments, a pair of symmetrical keys may be generated by the given edge network device 110, with one remaining with the given edge network device 110 and the other provided to the one or more of the control devices 120 such that the one or more of the control devices 120 may distribute the other symmetrical key to other edge network devices that communicate with the given edge network device 110. In such a way, each edge network device that is to communicate with the given edge network device 110 based on the policies of the one or more of the control devices 120 may receive the symmetrical key.

In some embodiments, traffic within the internal network domain 105 may be encrypted, such as with two-way authentication using Advanced Encryption Standard (AES) with a 256-bit length key over one or more Datagram Transport Layer Security (DTLS) and/or Transport Layer Security (TLS) connections between edge network devices 110.

In some embodiments, the one or more of the control devices 120 may store authentication information for one or more (or all) of the edge network devices 110 within the internal network domain 105. In these and other embodiments, a device may be prevented from communicating within the internal network domain 105 unless the device has authentication information that matches or otherwise corresponds to the stored authentication information of the one or more of the control devices 120. In some embodiments, the authentication information may be used when the edge network devices 110 first come on line to establish the control plane connection, and any device without a control plane connection with the one or more of the control devices 120 may be prevented from communicating within the internal network domain 105.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), Bi-directional Forwarding Detection (BFD), among others. Additionally or alternatively, the edge network devices 110 may support other network functionalities such as differentiated services code point (DSCP) tagging or type of service (TOS) tagging, Quality of Service (QoS) monitoring, Service Level Agreements (SLA), Internet Protocol (IP) forwarding, Internet Protocol Security (IPsec), Access Control Lists (ACL), among others.

In some embodiments, the edge network devices 110 may locally maintain one or more route tables. In some embodiments, the edge network devices 110 may adjust or modify the route tables based on one or more policies sent from the one or more of the control devices 120. For example, one or more entries may be removed, discarded, or otherwise not added to the route tables by the edge network devices 110 based on the one or more policies. In some embodiments, the edge network devices 110 may include logic to update, modify, and/or generate the route tables based on policies from the one or more of the control devices 120 and/or from traffic handled by the edge network devices 110. The one or more route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the one or more of the control devices 120. For example, the particular edge network device 110 may compute a routing decision based on the one or more policies that the particular edge network device 110 has received from the one or more of the control devices 120.

In some embodiments, the edge network devices 110 may locally maintain one or more hub ID configuration preferences in a data storage. In some embodiments, the edge network devices 110 may adjust or modify the hub ID configuration preferences based on one or more hub ID configuration preference messages sent from the one or more of the control devices 120. For example, one or more entries may be removed, discarded, or otherwise not added to the hub ID configuration preferences by the edge network devices 110 based on the one or more messages. In some embodiments, the edge network devices 110 may include logic to update and/or modify, the hub ID configuration preferences based on hub ID configuration preference messages from the one or more of the control devices 120.

In some embodiments, one or more of the edge network devices 110 and/or the one or more of the control devices 120 may be implemented as one or more virtual machines operating on one or more physical computing devices. Additionally or alternatively, the edge network devices 110 and/or the one or more of the control devices 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
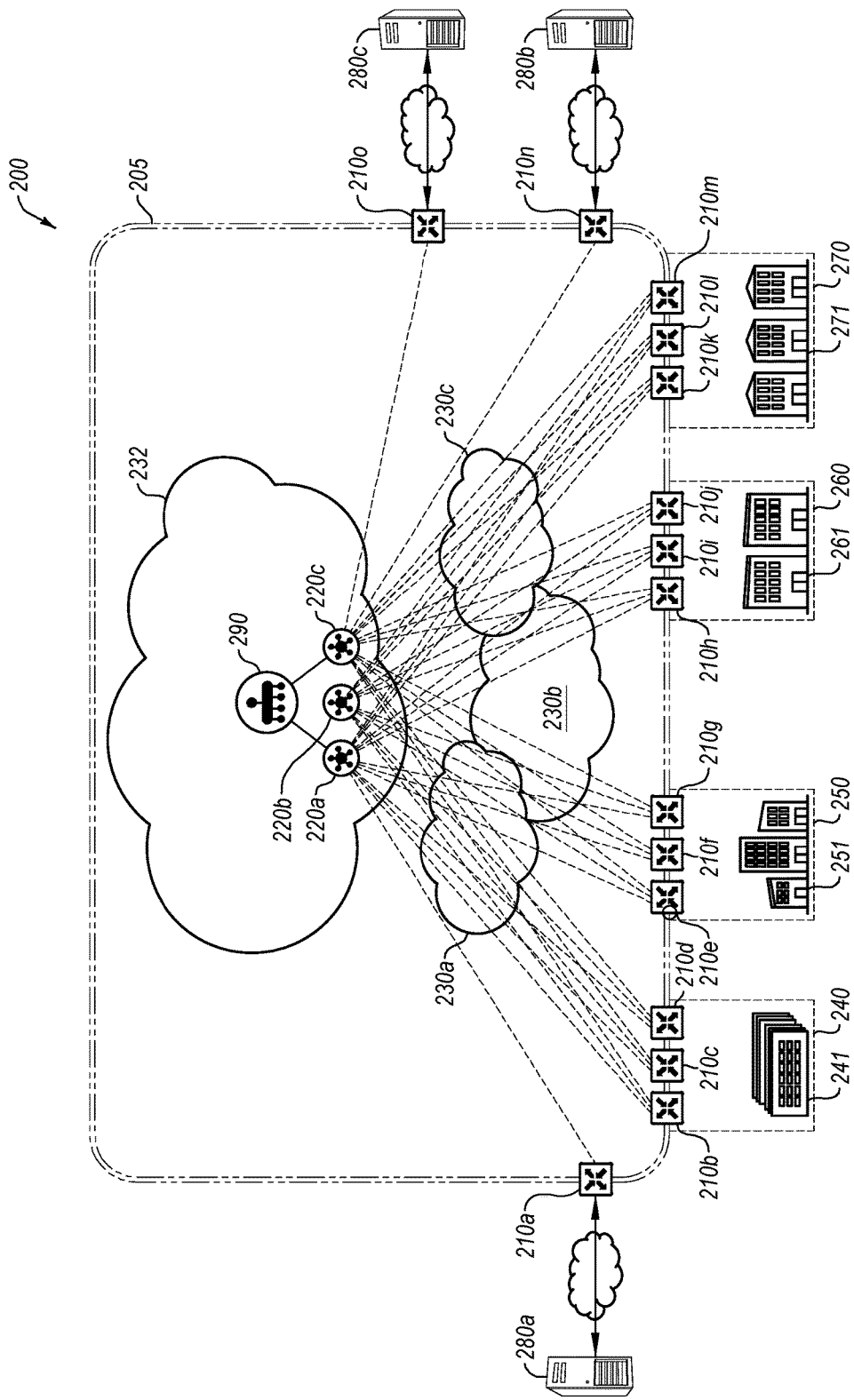
FIG. 2 illustrates another example system implementing a SDN.

FIG. 2 illustrates another example system 200 of network components implementing a SDN, in accordance with one or more embodiments of the present disclosure. The system 200 may include one or more edge network devices 210 (such as edge network devices 210a-210o), one or more control devices 220 (such as control devices 220a, 220b, and 220c), and one or more communication networks 230 (such as communication networks 230a, 230b, and 230c). The edge network devices 210 may be similar or comparable to the edge network devices 110 of FIG. 1, the control devices 220 may be similar or comparable to the control device 120 of FIG. 1, and the communication networks 230 may be similar or comparable to the communication network 130 of FIG. 1. The system 200 may be a similar or comparable system to the system 100 of FIG. 1, although expanded to include additional network components and additional external network domains.

The system 200 may include an internal network domain 205 in and between the edge network devices 210, in a similar or comparable manner to that described with respect to the system 100 of FIG. 1. The system 200 additionally may include multiple external network domains. For example, a data center 240 may represent a first external network domain, a campus 250 may represent a second external network domain, a branch 260 may represent a third external network domain, and a remote site 270 may represent a fourth external network domain. In these and other embodiments, each external network domain may include one or more edge network devices 210 acting as a bridge between the internal network domain 205 and the given external network domain. Additionally or alternatively, one or more of the external network domains may functionally operate as being accessible from the other external network domains as though in a single network by being communicatively coupled through the internal network domain 205.

In some embodiments, the system 200 may include one or more external resources 280 (such as the external resources 280a-280c). The external resources 280 may be operated by the same entity or organization that operates the internal network domain 205, or may be operated by a different entity. In these and other embodiments, the system 200 may include an edge network device 210 that may be associated with a particular external resource 280. For example, the system 200 may include an edge network device 210 located within a regional co-location facility. A regional co-location facility may include a location with directed or guaranteed access to the Internet or other communication protocols at a given physical location. In some embodiments, a regional co-location facility may include a prioritized or improved connection to one or more of the external resources 280. In some embodiments, the regional co-location facility may be at a designated geographical location that may be physically proximate one or more of the external network domains. For example, the data center 240 may be located in New York, and the branch 260 may be located in Dallas Tex., and the edge network device 210n may be in a regional co-location facility in Houston, Tex.

The external resources 280 may include any computing service available for consumption by the system 200. For example, the external resources 280 may include a cloud-based service such as a software subscription or software as a service (SaaS) (such as Microsoft Office 365®, Azure®, Google Apps®, Workforce®, Amazon Web Services®, WorkDay®, DocuSign®, GoToMeeting®, WebEx®, QuickBooks®, and/or others), media services (such as YouTube®, NetFlix®, Pandora®, Spotify®, and/or others), and/or others. In these and other embodiments, the external resources 280 may include a third party network to facilitate access to the external resource 280 with one or more access points at various geographical locations. For example, a SaaS may include an access server in Austin, Tex.; Palo Alto, Calif.; and New York, N.Y. for accessing the third party network.

In some embodiments, the system 200 may be geographically distributed. For example, the data center 240 may be located in St. Paul, Minn.; the campus 250 may be located in Des Moines, Iowa; there may be branches 260 in Seattle, Wash.; Los Angeles, Calif.; Atlanta, Ga.; and Orlando, Fla.; and there may be remote sites 270 in London, England; Berlin, Germany; and Seoul, Korea. In these and other embodiments, the system 200 may use the communication networks 230 and the internal network domain 205 to facilitate communication between all of these distributed physical locations as a single network.

In some embodiments, one or more of the external network domains may use one or more applications with resources in the data center 240, such as Microsoft Exchange®, SharePoint®, Oracle e-Business Suite®, and/or others. For example, a workstation operating at the campus 250 may operate Microsoft Exchange®. The operation of the application may include a data flow that goes from the workstation to the edge network device 210e in the external network domain of the campus 250. The data flow may go from the edge network device 210e to one of the edge network devices 210b, 210c, and/or 210d associated with the data center 240 through the internal network domain 205. The one of the edge network devices 210b, 210c, and/or 210d may route the traffic to the Microsoft Exchange® server in the external network domain of the data center 240. Additionally or alternatively, the operation of the application may include a data flow in the reverse order of data flowing from the Microsoft Exchange® server to the workstation.

In some embodiments, the system 200 may include a network management device 290 that may communicate with the control devices 220 over a management network 232. The network management device 290 may provide management and control of one or more devices associated with the internal network domain 205, including the edge network devices 210, the control devices 220, and/or others. For example, the network management device 290 may provide a graphical user interface (GUI) that provides a network administrator with access to control or observe operation of the internal network domain 205. In some embodiments, the network administrator may input policies and/or hub ID configuration preferences via the network management device 290 that may be communicated to the control devices 220 for implementation via the edge network devices 210. In some embodiments, the network management device 290 may provide a GUI dashboard with a visual and/or textual description of one or more properties of the internal network domain 205, such as a number and/or status and/or health of edge network devices 210, a number and/or status of control devices 220, a number of and/or last time of reboot, transport health (such as loss, latency, and/or jitter), a number of sites that are operating or not operating, application consumption of network resources, application routing, and/or others.

In some embodiments, the network management device 290 may be configured to recognize approved edge network devices 210 and/or control device 220. For example, the network management device 290 may maintain a list of serial numbers, MAC addresses, or other uniquely identifying information for the edge network devices 210 and/or the control devices 220. In these and other embodiments, communication in the internal network domain 205 may be restricted to edge network devices 210 and/or control devices 220 with identifying information on the list maintained by the network management device 290.

In some embodiments, the network management device 290 may be configured to generate and/or store configurations and/or hub ID configuration preferences of one or more edge network devices 210 and/or control devices 220. For example, a network administrator may use the network management device 290 to configure a particular edge network device 210 and may store that configuration as a template that may be applied to future edge network devices. Additionally or alternatively, a template for the edge network devices 210 may be provided by a third party and applied to a new edge network device 210. In these and other embodiments, a template for the control devices 220 may be generated, stored, and/or applied to a new control device 220. Additionally or alternatively, such a template may be used to automatically configure a newly deployed edge network device 210. For example, the newly deployed edge network device 210 may be brought online and connected to a corresponding control device 220. The corresponding control device 220 may verify the serial number of the edge network device 210 with the network management device 290, and may obtain a template from the network management device 290 for the edge network device 210. The control device 220 may send the template to the edge network device 210 to be automatically installed to configure the edge network device 210 according to the template.

In some embodiments, the network management device 290 may be implemented as a physical device or a virtualized machine. In these and other embodiments, the network management device 290 may be physically located proximate a centralized location, such as within the data center 240 or at the campus 250.

Modifications, additions, or omissions may be made to FIG. 2 without departing from the scope of the present disclosure. For example, while illustrated as including a certain number of edge network devices 210 and external network domains, the system 200 may include any number of edge network devices 210 and external network domains.

Figure 3:
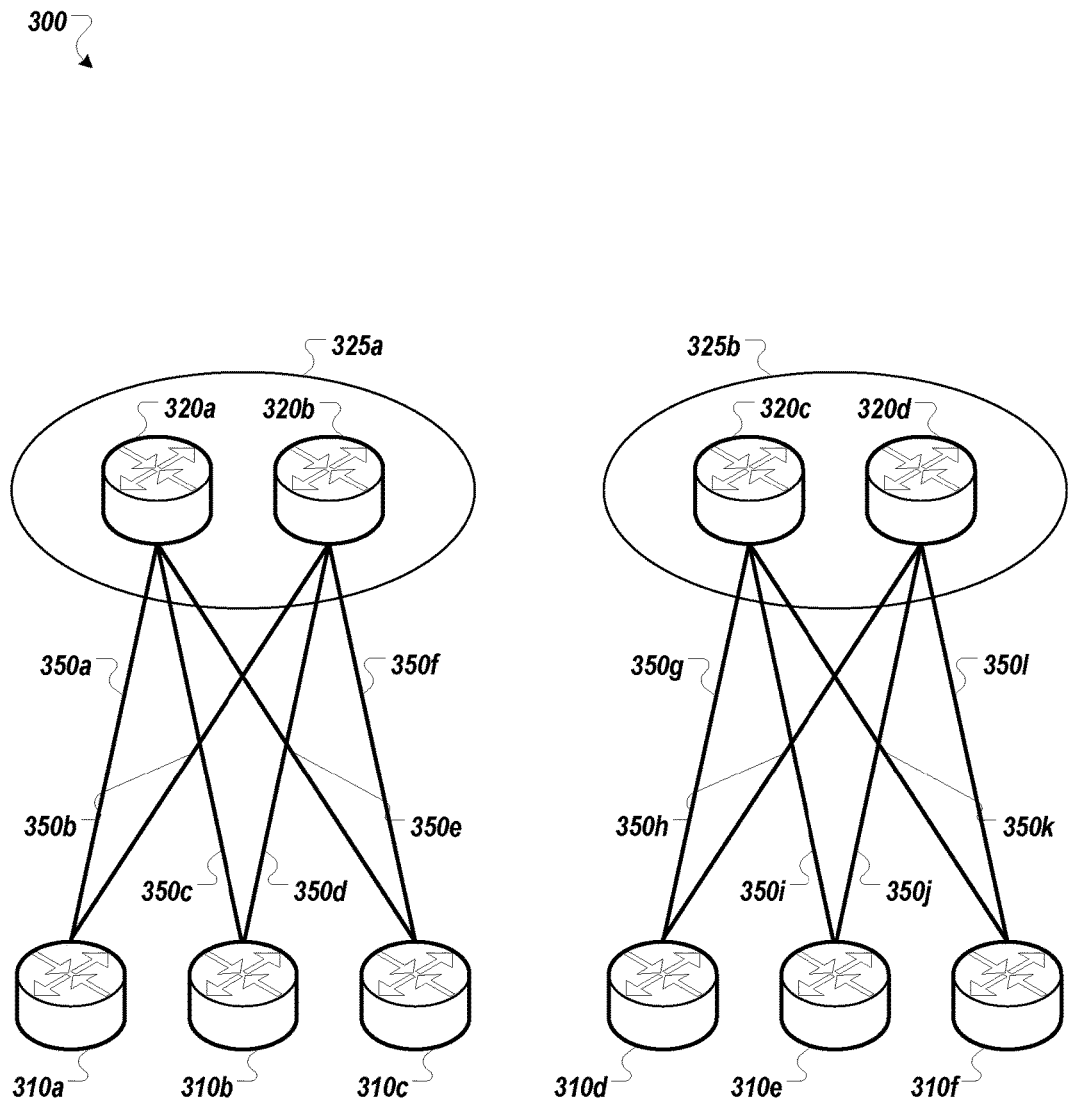
FIG. 3 illustrates an additional example system as part of a SDN.

FIG. 3 illustrates an additional example system 300, in accordance with one or more embodiments of the present disclosure. The system 300 may include one or more edge network devices 310 (such as edge network devices 310a, 310b, 310c, 310d, 310e, and 310f), one or more control devices 320 (such as control devices 320a, 320b, 320c, and 320d). The edge network devices 310 may be communicatively coupled to one or more control devices 320 by one or more control plane links 350 (such a control plane links 350a, 350b, 350c, 350d, 350e, 350f, 350g, 350h, 350i, 350j, 350k, and 350l) that form at least a portion of a control plane.

The edge network devices 210 may be similar or comparable to the edge network devices 110 of FIG. 1 and/or to the edge network devices 210 of FIG. 2 and the control devices 220 may be similar or comparable to the control device 120 of FIG. 1 and/or to the control devices 220 of FIG. 2. The system 300 may be a similar or comparable system to the system 100 of FIG. 1, although expanded to include additional network components and additional external network domains. The system 300 may be a similar or comparable system to the system 200 of FIG. 2, although expanded to include additional network components and additional external network domains.

One or more control devices 320 may be grouped in a set of control plane devices, which may be referred to as a hub group 325. As illustrated, control devices 320a and 320b are in a hub group 325a and control device 320c and 320d are in a hub group 325d. Any number of hub groups may exist and a hub group may include any number of hubs. As the term is used herein, a hub may refer to a network node that is configured to communicate with other nodes. For example, a control device 320 may be a hub. An edge network device 310 may also be a hub. For example, an edge network device 310 may be a spoke to a "North America" network and may be a hub for an "East Coast" network. Each device in the system (e.g., each control device 320 and each edge network device 310) may have an associated hub ID. The hub ID may be assigned by a network administrator or may be automatically assigned. In at least some embodiments, a hub group 325 may also have a hub ID. In an example, a device may serve as both a hub and a spoke.

One or more of the control devices 320 may generate and/or update one or more hub ID configuration preferences to help the edge network devices 310 to determine connectivity to different nodes through an internal network domain. The hub ID configuration preferences may inform an edge network device 310 which hub (e.g., control device 320 and/or another edge network device) to connect to. The hub ID configuration preferences may include hub IDs and connection priority information. For example, the hub ID configuration preferences may indicate that edge network device 310 is to connect to one or both of the control device 320a and 320b before connecting to any other control device 320. In such an embodiment, the control device 320a and 320b may have the highest connection priority information with respect to any other device to which the edge network device 310 may connect. The hub ID configuration preferences may also indicate that the edge network device 310 is to connect to one or both of the control device 320c and 320d in the event that both of the control devices 320a and 320b are unavailable or not found. In such an embodiment, the control device 320a and 320b may have the second highest connection priority information with respect to any other device to which the edge network device 310 may connect. The hub ID configuration preferences may indicate any number of devices and corresponding connection priority information. The hub ID configuration preferences may also indicate a "last resort" device or set of devices to which the edge network device 310 may connect if no other devices are available.

In some embodiments, the one or more of the control devices 320 may provide management and control of one or more devices associated with the system 300, including the edge network devices 310, the control devices 320, and/or others. For example, the one or more of the control devices 320 may provide a graphical user interface (GUI) that provides a network administrator with access to control or observe operation of the system 300. In some embodiments, the network administrator may input hub ID configuration preferences via the one or more of the control devices 320 that may be communicated to other control devices 320 for implementation via the edge network devices 310. In some embodiments, the one or more of the control devices 320 may provide a GUI dashboard with a visual and/or textual description of one or more properties of the system 300, such as a number and/or status and/or health of edge network devices 310, a number and/or status of control devices 320, a number of and/or last time of reboot, transport health (such as loss, latency, and/or jitter), a number of sites that are operating or not operating, application consumption of network resources, application routing, a set of configuration preferences that are specific to each device in the system 300, and/or others.

The one or more of the control devices 320 may send the hub ID configuration preferences to the edge network devices 310 via one or more hub ID configuration preferences messages. Using the hub ID configuration preferences messages, the edge network devices 310 may connect to various nodes in the system 300. As illustrated, the edge network device 310a is communicatively coupled to the control device 320a by the control plane link 350a and is communicatively coupled to the control device 320b by the control plane link 350b. Similarly, the edge network device 310b is communicatively coupled to the control device 320a by the control plane link 350c and is communicatively coupled to the control device 320b by the control plane link 350d. The edge network device 310c is communicatively coupled to the control device 320a by the control plane link 350e and is communicatively coupled to the control device 320b by the control plane link 350f. Such connections may be dictated by the appropriate hub ID configuration preferences for each respective edge network device 310.

As also illustrated, the edge network device 310d is communicatively coupled to the control device 320c by the control plane link 350g and is communicatively coupled to the control device 320d by the control plane link 350h. Similarly, the edge network device 310e is communicatively coupled to the control device 320c by the control plane link 350i and is communicatively coupled to the control device 320d by the control plane link 350j. The edge network device 310f is communicatively coupled to the control device 320c by the control plane link 350k and is communicatively coupled to the control device 320d by the control plane link 350l. Such connections may be dictated by the appropriate hub ID configuration preferences for each respective edge network device 310.

Modifications, additions, or omissions may be made to FIG. 3 without departing from the scope of the present disclosure. For example, while illustrated as including a certain number of edge network devices 310, the system 300 may include any number of edge network devices 310. As another example, while illustrated as including a single path between any two devices, any number of paths over any number of mediums may be included between devices. As yet another example, while illustrated as including a certain number of control devices 320, the system 300 may include any number of control devices 320. As a further example, while illustrated as including a certain number of hub groups 325, the system 300 may include any number of hub groups 325.

Figure 4:
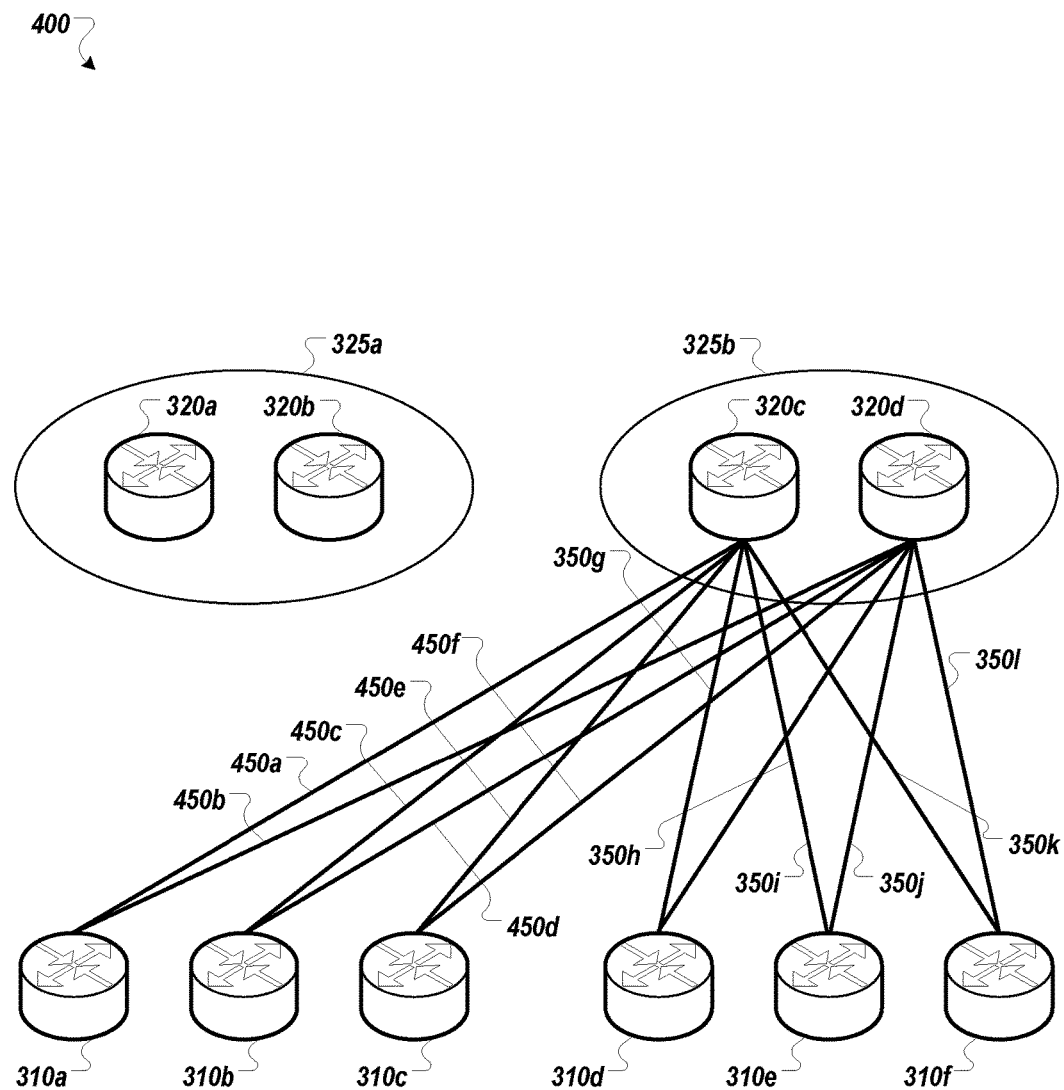
FIG. 4 illustrates another example system implementing a SDN.

FIG. 4 illustrates another example system 400, in accordance with one or more embodiments of the present disclosure. The system 400 may be similar to the system 300. As such, the system 400 may include one or more edge network devices 310 (such as edge network devices 310a, 310b, 310c, 310d, 310e, and 310f), one or more control devices 320 (such as control devices 320a, 320b, 320c, and 320d). The edge network devices 310 may be communicatively coupled to one or more control devices 320 by one or more control plane links 350 (such a control plane links 350a, 350b, 350c, 350d, 350e, 350f, 350g, 350h, 350i, 350j, 350k, and 350l) that form at least a portion of a control plane.

As illustrated in FIG. 3, edge network devices 310a, 310b, 310c were variously coupled to the control devices 320a, 320b. At some point, the edge network devices 310a, 310b, 310c may not be able to connect to the control devices 320a, 320b. For example, the control devices 320a, 320b may become unavailable, may fail, may be overloaded, etc. In response to the edge network devices 310a, 310b, 310c may not be able to connect to the control devices 320a, 320b, the edge network devices 310a, 310b, 310c may consult the locally stored hub ID configuration preferences to determine another node to which to connect. For example, the hub ID configuration preferences may indicate to the edge network devices 310a, 310b, 310c that the next hubs to connect to are the control devices 320c, 320d. Accordingly, the edge network devices 310a, 310b, 310c may identify the hub IDs for the control devices 320c, 320d. The edge network devices 310a, 310b, 310c may send an advertisement message with a corresponding t.loc to the control devices 320c, 320d, based on the determined hub ID of the control devices 320c, 320d. A t.loc may be referred to as a transport.location, which may include an object that creates connections of some particular class to some particular address space. In at least some embodiments, the edge network devices 310a, 310b, 310c may identify the "next hubs" using a hub ID of a hub group.

The edge network devices 310a, 310b, 310c may establish a connection with the control devices 320c, 320d. As illustrated, the edge network device 310a may communicatively couple to the control device 320c by a control plane link 450a and may communicatively couple to the control device 320d by a control plane link 450b. Similarly, the edge network device 310b may communicatively couple to the control device 320c by a control plane link 450c and may communicatively couple to the control device 320c by a control plane link 450d. The edge network device 310c may communicatively couple to the control device 320c by a control plane link 450e and may communicatively couple to the control device 320d by a control plane link 450f. Such connections may be dictated by the appropriate hub ID configuration preferences for each respective edge network device 310.

Modifications, additions, or omissions may be made to FIG. 4 without departing from the scope of the present disclosure. For example, while illustrated as including a certain number of edge network devices 410, the system 400 may include any number of edge network devices 410. As another example, while illustrated as including a single path between any two edge network devices 410, any number of paths over any number of mediums may be included between edge network devices 410.

Figure 5:
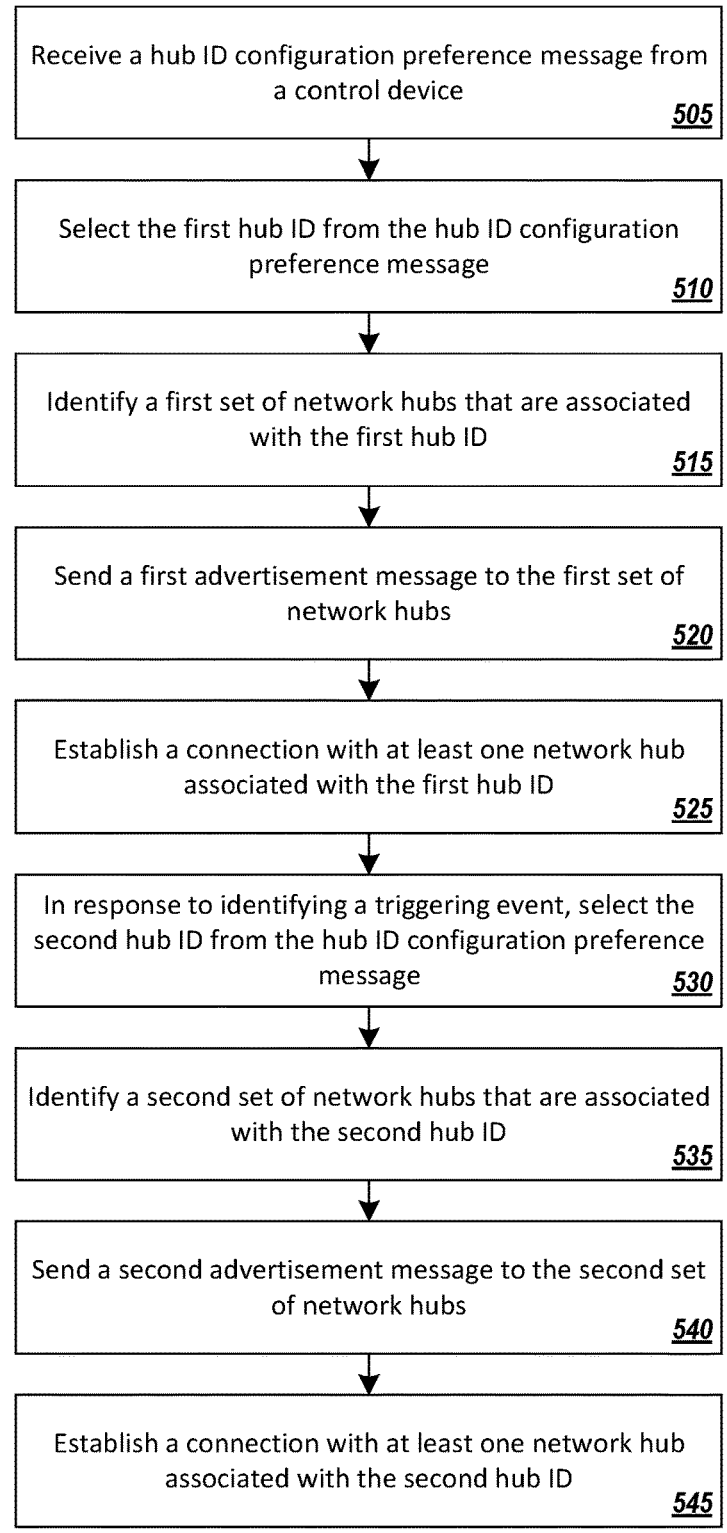
FIG. 5 illustrates a flowchart of an example method 500 to provide network hub site redundancy and failover.

FIG. 5 illustrates a flowchart of an example method 500 to provide network hub site redundancy and failover, in accordance with one or more embodiments of the present disclosure. The method may be performed by processing logic that may include hardware (circuitry, dedicated logic, etc.), software (such as is run on a general purpose computer system or a dedicated machine), or a combination of both, which processing logic may be included in the any of the network devices (e.g., the edge network devices 110, 210, or 310 of FIGS. 1-4), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 500 may begin at block 505, where the processing logic may receive a hub ID configuration preference message from a control device. The hub ID configuration preference message may include an order in which to connect to network hubs that are associated with the hub IDs. The hub ID configuration preference message may include a first hub ID associated with a first connection priority and a second hub ID associated with a second connection priority. The first connection priority may include a higher priority as compared to the second connection priority. The hub ID configuration preference message may include a hub of last resort.

At block 510, the processing logic may select the first hub ID from the hub ID configuration preference message based on a first connection priority having a higher priority as compared to a second connection priority.

At block 515, the processing logic may identify a first set of network hubs that are associated with the first hub ID. In at least some embodiments, the first hub ID includes a hub group ID. Identifying the first set of network hubs that are associated with the first hub ID may include selecting one or more hubs associated with the hub group ID. At block 520, the processing logic may send a first advertisement message to the first set of network hubs.

At block 525, the processing logic may establish a connection with at least one network hub associated with the first hub ID. Establishing the connection with the at least one network hub associated with the first hub ID may include establishing the connection on a control plane of that is isolated from a data plane.

At block 530, the processing logic may select the second hub ID from the hub ID configuration preference message in response to identifying a triggering event. The triggering event may include a failure of the at least one network hub associated with the first hub ID. The triggering event may include a loss of connection to the at least one network hub associated with the first hub ID.

At block 535, the processing logic may identify a second set of network hubs that are associated with the second hub ID. At block 540, the processing logic may send a second advertisement message to the second set of network hubs. At block 545, the processing logic may establish a connection with at least one network hub associated with the second hub ID. Establishing the connection with the at least one network hub associated with the second hub ID may include establishing the connection on the control plane of that is isolated from the data plane.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
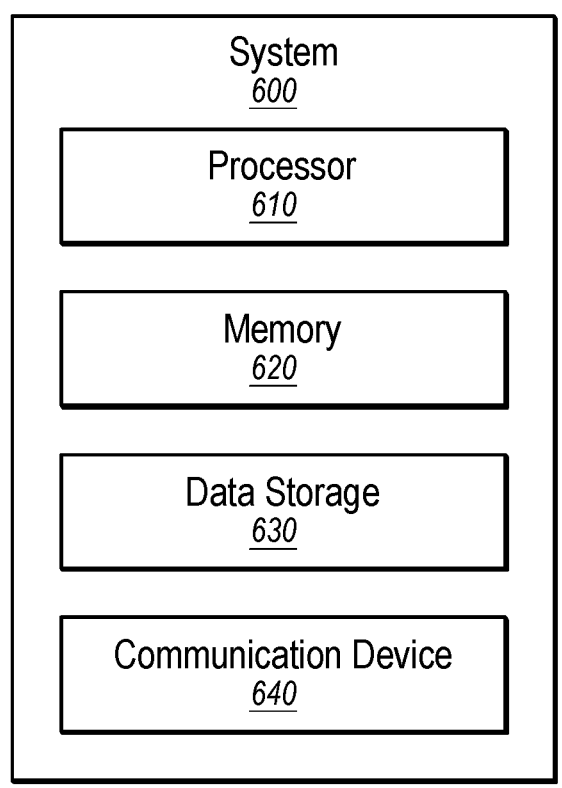
FIG. 6 illustrates an example computing system.

FIG. 6 illustrates an example computing system 600, according to at least one embodiment described in the present disclosure. The system 600 may include any suitable system, apparatus, or device configured to test software. The computing system 600 may include a processor 610, a memory 620, a data storage 630, and a communication unit 640, which all may be communicatively coupled. In some embodiments, any of the network devices (e.g., the edge network devices 110, 210, or 310 of FIGS. 1-4), control devices (e.g., the control devices 120, 220, or 320, of FIGS. 1-4), local computing devices or other computing devices of the present disclosure may be implemented as the computing system 600. Additionally or alternatively, one or more of the network devices, control devices, local computing devices or other computing devices may be implemented as virtualized machines operating on a physical computing system such as the computing system 600.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform the method 500 FIG. 5.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network, such as an MPLS connection, the Internet, a cellular network (e.g., an LTE network), etc. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 640 may permit data to be exchanged with a network and/or any other devices or systems described in the present disclosure. For example, the communication unit 640 may allow the system 600 to communicate with other systems, such as network devices, control devices, and/or other networks.

Modifications, additions, or omissions may be made to the system 600 without departing from the scope of the present disclosure. For example, the data storage 630 may be multiple different storage mediums located in multiple locations and accessed by the processor 610 through a network.

As indicated above, the embodiments described in the present disclosure may include the use of a special purpose or general purpose computer (e.g., the processor 610 of FIG. 6) including various computer hardware or software modules, as discussed in greater detail below. Further, as indicated above, embodiments described in the present disclosure may be implemented using computer-readable media (e.g., the memory 620 or data storage 630 of FIG. 6) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
receiving a hub ID configuration preference message from a control device, wherein the hub ID configuration preference message includes an order in which to connect to network hubs that are associated with the hub IDs;
selecting a first hub ID from the hub ID configuration preference message based on a first connection priority having a higher priority as compared to a second connection priority;
identifying a first set of network hubs that are associated with the first hub ID;
sending a first advertisement message to the first set of network hubs;
establishing a connection with at least one network hub associated with the first hub ID;
in response to identifying a triggering event, selecting a second hub ID from the hub ID configuration preference message;
identifying a second set of network hubs that are associated with the second hub ID;
sending a second advertisement message to the second set of network hubs; and
establishing a connection with at least one network hub associated with the second hub ID.

2. The method of claim 1, wherein the hub ID configuration preference message includes the first hub ID associated with the first connection priority and the second hub ID associated with the second connection priority, wherein the first connection priority includes a higher priority as compared to the second connection priority.

3. The method of claim 1, wherein establishing the connection with the at least one network hub associated with the first hub ID includes establishing the connection on a control plane of that is isolated from a data plane.

4. The method of claim 1, wherein the first hub ID includes a hub group ID, wherein identifying the first set of network hubs that are associated with the first hub ID includes selecting one or more hubs associated with the hub group ID.

5. The method of claim 1, wherein the triggering event includes a failure of the at least one network hub associated with the first hub ID.

6. The method of claim 1, wherein the triggering event includes a loss of connection to the at least one network hub associated with the first hub ID.

7. The method of claim 1, wherein the hub ID configuration preference message includes a hub of last resort.

8. A non-transitory computer-readable medium that includes computer-readable instructions stored thereon that are executable by a processor to perform or control performance of operations comprising:
receive a hub ID configuration preference message from a control device, wherein the hub ID configuration preference message includes an order in which to connect to network hubs that are associated with the hub IDs;
select a first hub ID from the hub ID configuration preference message based on a first connection priority having a higher priority as compared to a second connection priority;
identify a first set of network hubs that are associated with the first hub ID;
send a first advertisement message to the first set of network hubs;
establish a connection with at least one network hub associated with the first hub ID;
in response to identifying a triggering event, select a second hub ID from the hub ID configuration preference message;
identify a second set of network hubs that are associated with the second hub ID;
send a second advertisement message to the second set of network hubs; and
establish a connection with at least one network hub associated with the second hub ID.

9. The non-transitory computer-readable medium of claim 8, wherein the hub ID configuration preference message includes the first hub ID associated with the first connection priority and the second hub ID associated with the second connection priority, wherein the first connection priority includes a higher priority as compared to the second connection priority.

10. The non-transitory computer-readable medium of claim 8, wherein establishing the connection with the at least one network hub associated with the first hub ID includes an operation to establish the connection on a control plane of that is isolated from a data plane.

11. The non-transitory computer-readable medium of claim 8, wherein the first hub ID includes a hub group ID, wherein identifying the first set of network hubs that are associated with the first hub ID includes an operation to select one or more hubs associated with the hub group ID.

12. The non-transitory computer-readable medium of claim 8, wherein the triggering event includes a failure of the at least one network hub associated with the first hub ID.

13. The non-transitory computer-readable medium of claim 8, wherein the triggering event includes a loss of connection to the at least one network hub associated with the first hub ID.

14. The non-transitory computer-readable medium of claim 8, wherein the hub ID configuration preference message includes a hub of last resort.

15. A system comprising:
a memory; and
one or more processors, the one or more processors configured to perform operations comprising:
receive a hub ID configuration preference message from a control device, wherein the hub ID configuration preference message includes an order in which to connect to network hubs that are associated with the hub IDs;
select a first hub ID from the hub ID configuration preference message based on a first connection priority having a higher priority as compared to a second connection priority;

identify a first set of network hubs that are associated with the first hub ID;

send a first advertisement message to the first set of network hubs;

establish a connection with at least one network hub associated with the first hub ID;

in response to identifying a triggering event, select a second hub ID from the hub ID configuration preference message;

identify a second set of network hubs that are associated with the second hub ID;

send a second advertisement message to the second set of network hubs; and establish a connection with at least one network hub associated with the second hub ID.

16. The system of claim 15, wherein the hub ID configuration preference message includes the first hub ID associated with the first connection priority and the second hub ID associated with the second connection priority, wherein the first connection priority includes a higher priority as compared to the second connection priority.

17. The system of claim 15, wherein when establishing the connection with the at least one network hub associated with the first hub ID, the one or more processors are configured to perform operations to establish the connection on a control plane of that is isolated from a data plane.

18. The system of claim 15, wherein the first hub ID includes a hub group ID, wherein when identifying the first set of network hubs that are associated with the first hub ID, the one or more processors are configured to perform operations to select one or more hubs associated with the hub group ID.

19. The system of claim 15, wherein the triggering event includes a failure of the at least one network hub associated with the first hub ID.

20. The system of claim 15, wherein the triggering event includes a loss of connection to the at least one network hub associated with the first hub ID.

* * * * *